United States Patent [19]

Ninagawa et al.

[11] Patent Number: 4,485,328
[45] Date of Patent: Nov. 27, 1984

[54] MONOCHROMATIC PICTURE TUBE

[75] Inventors: Chikayoshi Ninagawa, Hyogo; Shigeya Ashizaki; Masamichi Kimura, both of Osaka; Atsushi Hosokawa, Kyoto, all of Japan

[73] Assignee: Matsushita Electronics Corporation, Osaka, Japan

[21] Appl. No.: 370,050

[22] Filed: Apr. 20, 1982

[30] Foreign Application Priority Data

Apr. 28, 1981 [JP] Japan ............................. 56-62378[U]
May 13, 1981 [JP] Japan ............................. 56-68889[U]

[51] Int. Cl.³ ........................ H01J 29/10; H01J 29/20
[52] U.S. Cl. .................................... 313/466; 313/474
[58] Field of Search ............... 313/474, 468, 478, 466, 313/467; 427/64, 68; 252/301.4 P, 301.4 S

[56] References Cited

U.S. PATENT DOCUMENTS 4,209,567  6/1980  Takahara et al. ............... 313/468 X
4,219,587  8/1980  Oba et al. ........................ 427/64
4,297,390  10/1981 Franz et al. ..................... 427/64
4,333,030  6/1982  Zitelli ............................. 313/478 X Primary Examiner—David K. Moore
Assistant Examiner—K. Wieder
Attorney, Agent, or Firm—Burgess, Ryan & Wayne

[57] ABSTRACT

A monochromatic picture tube whose faceplate has a transmittance of 17 to 23% is provided. In order to obtain the same transmittance as described above, black di-iron trioxide is coated on phosphor grains to form a phosphor screen on the faceplate. Therefore, a picture on the screen results in contrast without eyestrain.

2 Claims, 6 Drawing Figures

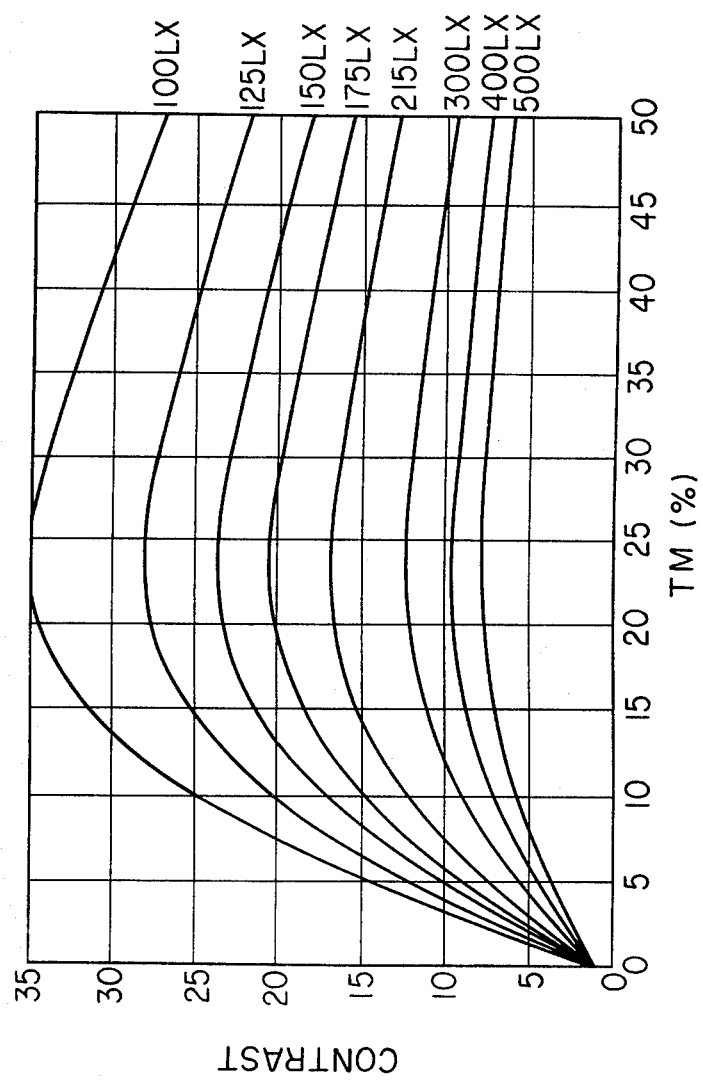

MONOCHROMATIC PICTURE TUBE

BACKGROUND OF THE INVENTION

The present invention relates to a monochromatic picture tube for a TV receiver or a device using a CRT.

When external light beams are reflected by a faceplate of a picture tube, contrast of an image is degraded and eyestrain occurs. Anti-reflection coating and frost treatment are applied to the surface of a monochromatic picture tube mounted in a computer terminal device, a wordprocessor and the like to reduce the reflected light. In certain instances, a black glass plate is adhered to the outer surface of the faceplate, but, the adhering process is time-consuming and the thickness of the faceplate of the picture tube becomes substantially great, resulting in lower resolution. This is especially true in picture tubes having a faceplate with frost treatment thus resulting in a resolution which is greatly degraded.

SUMMARY OF THE INVENTION

It is, therefore, an object of the present invention to provide a monochromatic picture tube for producing an image of good contrast and the elimination of eyestrain.

According to one embodiment of the present invention, the transmittance of the faceplate of the picture tube must be 17 to 23% so that a picture on the screen can be seen with minimum eyestrain.

In practice, a transmittance as low as 17 to 23% cannot be easily obtained with only the faceplate. According to another embodiment of the present invention, a transmittance of 17 to 23% can be obtained by coating a black colorant such as di-iron trioxide ($Fe_2O_3$) on phosphor grains of the picture tube. As a result, the transmittance of the faceplate will be improved by 25 to 32%.

Other objects, features and advantages of the present invention will be apparent from the following description when taken in conjunction with the accompanying drawings.

BRIEF DESCRIPTION OF THE DRAWINGS

FIG. 2 is a graph for explaining contrast as a function of transmittance on the faceplate of the picture tube;

DETAILED DESCRIPTION OF THE INVENTION

Figure 1:
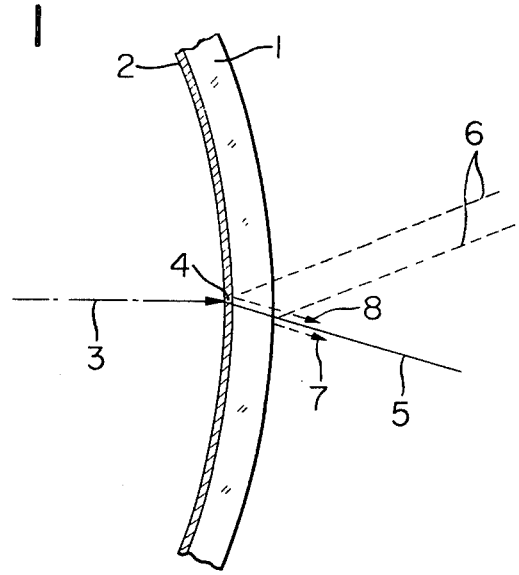
FIG. 1 is a sectional view of a faceplate and a phosphor screen formed thereon in order to explain contrast of a picture tube.

Referring to FIG. 1, a faceplate 1 of a picture tube is made of glass. A phosphor screen 2 is adhered to the inner surface of the faceplate 1. An electron beam 3 is radiated on the phosphor screen 2, and a beam spot 4 is formed thereon. A light beam 5 from the beam spot 4 is guided to the outside through the faceplate 1. Meanwhile, about 4% of external light beams 6 is reflected by the outer surface of the faceplate 1 to provide a reflected light beam 7. Part of the external light beams 6 transmitted through the faceplate 1 is reflected by the inner surface of the faceplate 1 to provide a reflected light beam 8. The ratio of the light beam 5 to the reflected light beams 7 and 8 substantially determines contrast of the picture on the screen.

The reflected light beam 7 as constant, and about 4% of the external light beams 6. However, the amount of the reflected light beam 8 is determined by transmittance (TM) of the faceplate 1 and the state of the phosphor screen 2. The reflected light beam 8 increases substantially in proportion to $(TM)^2$. Therefore, if a constant determined by the state of the phosphor screen 2 is defined as $K_1$, a reflectance R is given by the following equation:

$$R = K_1(TM)^2 + 4 \qquad (1)$$

If the luminance of the external light beams 6 on the outer surface of the faceplate 1 is defined as L and the effective brightness of the phosphor screen 2 is defined as B, the contrast B is given by the following equation:

$$C = \frac{\pi \cdot B}{\{K_1(TM)^2 + 4\}L} + 1 \qquad (2)$$

The effective brightness B is proportional to the transmittance TM of the faceplate 1, that is, $B = K_2$ (where $K_2$ is the proportional constant). Therefore, the contrast C is given as:

$$C = \frac{K_2(TM)}{\{K_1(TM)^2 + 4\}L} \qquad (3)$$

A typical phosphor which forms the phosphor screen 2, that is, a $P_4$ phosphor is coated on the inner surface of the faceplate of a 12 inch picture tube. The contrast as a function of transmittance of the faceplate is plotted using luminance of the external light beams on the faceplate 1 as the parameter, as shown in FIG. 2. The contrast is maximized when a transmittance of the faceplate 1 is 24%. This value does not change with changes in the level of external light beams. Transmittance is in a range of 17 to 33% when the contrast is about the maximum value.

However, in practice, when characters or figures are displayed on the picture tube, a picture on the screen with transmittance of 17% significantly differs from that with the transmittance of 33%. In particular, a picture with a transmittance of 17% is easy to see. This depends on differences in reflectance of the faceplate 1. Even if the same contrast is established, reflectance is decreased when the transmittance is decreased. The background of the picture on the screen thus becomes darker.

Figure 3:
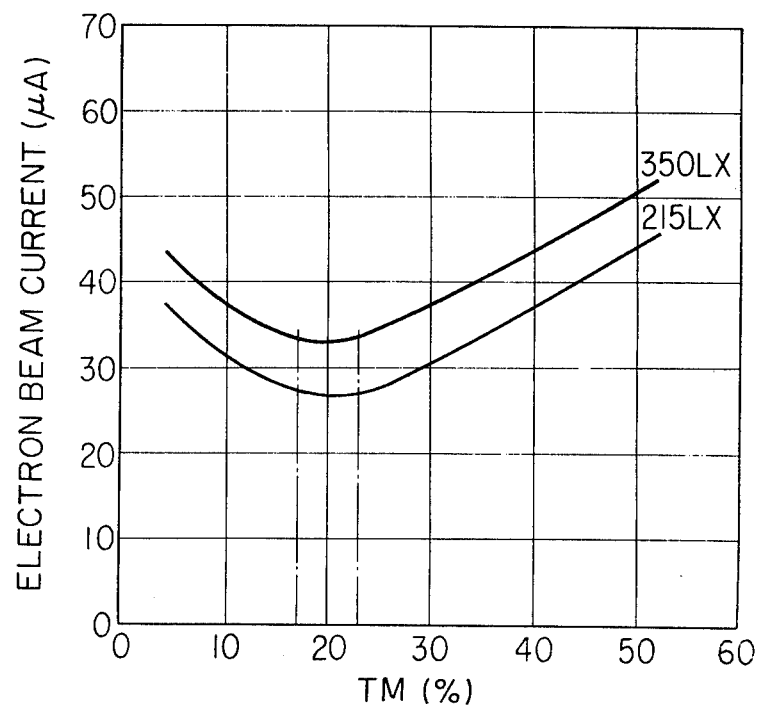
FIG. 3 is a graph of a beam current as a function of transmittance of the faceplate of the picture tube in order to define optimal brightness on the screen.

A number of picture tubes with faceplates which differ only in transmittance were prepared. These picture tubes were mounted in data display devices. Each operator adjusted each screen to attain optimal brightness as he felt in accordance with changes in the electron beam current. Then, an experiment was conducted wherein the optimal transmittance of the faceplate was measured. Results are shown in FIG. 3. The electron beam current corresponding to optimal brightness is shown as a function of transmittance of the faceplate 1 using the luminance of the external light beams on the outer surface of the faceplate 1 as the parameter.

As is apparent from FIG. 3, the electron beam current is minimized when the transmittance of the faceplate is about 20%. The lesser the electron beam current, the higher the resolution. Further, loads on the cathode and phosphor screen are decreased, resulting in long service life and economy.

In consideration of the above results, the transmittance of the faceplate is preferably set to be in a range of 17 to 23%.

However, there are various problems in manufacturing faceplates of a low transmittance by mass production. If the same glass material as used in the conventional faceplate is used and the thickness of the faceplate is made great to obtain a low transmittance, the picture tube must be heated over a long time interval and may be broken. Alternatively, if substantially a black glass material is used, heat absorption is great on the side of the burner melting the glass, while heat absorption is small on the opposite side of the burner, resulting in nonuniform melting. However, if a black colorant is coated on the phosphor grains, the transmittance of the picture tube need not be decreased to 20% to obtain a sufficiently dark screen when the electron beam is not radiated on the phosphor screen.

The color screen of the monochromatic picture tube for display is preferably gray when the picture tube is not energized. Even if another colorant such as blue, green or red is used, a sufficiently dark screen cannot be obtained when the picture tube is not energized. Therefore, the most preferable colorant is black di-iron trioxide ($Fe_2O_3$), which has different colors with changes in the fabricating process.

Figure 4A:
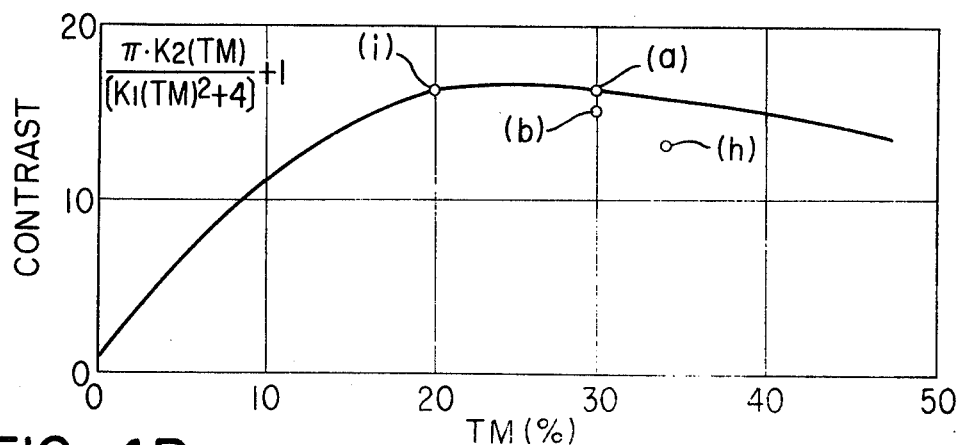
FIGS. 4A to 4C are graphs for explaining contrast, reflectance and brightness as a function of transmittance, respectively.
Figure 4B:
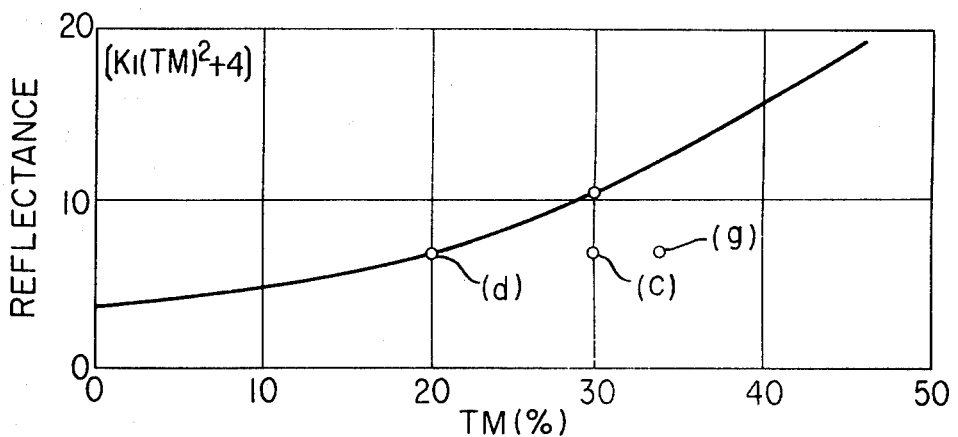
Figure 4C:
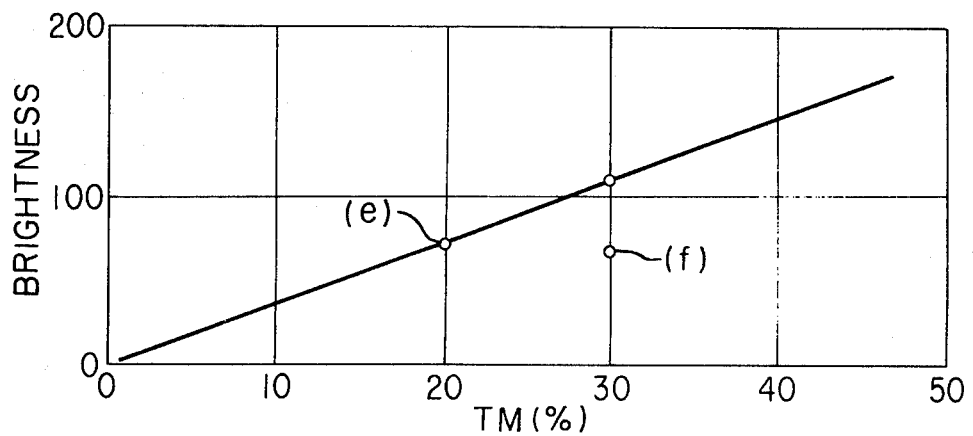

Phosphor grains coated with black di-iron trioxide in the amount of 2.5% by weight are applied on the inner surface of the faceplate having a transmittance of 30% to form the phosphor screen. The contrast, reflectance and brightness as a function of transmittance are plotted in FIGS. 4A, 4B and 4C, respectively. The contrast is 15.5 (b) while the contrast is 16.4 (a) when non-coated phosphor grains are used. The reflectance becomes 7% (c) which is substantially the same as the reflectance (d) when the non-coated phosphor grains are used. The brightness is 70 Nit (f) which is only slightly lower than 74 Nit (e). The latter brightness is obtained when the transmittance of the faceplate is determined to be 20% and the non-coated phosphor grains are used.

When the transmittance of the faceplate is determined to be 34% and di-iron trioxide is coated in the amount of 4% by weight on phosphor grains to form the phosphor screen, the transmittance remains 7% (g). The contrast is increased to 13.4 (h). This corresponds to 82% of 16.3 (i) when the transmittance is 20% and non-coated phosphor grains are used.

Therefore, according to the present invention, the phosphor coated by the black colorant is preferably used to form the phosphor screen on the inner surface of the faceplate having the transmittance of less than 32% (25 to 32%), preferably, about 30%. The reflectance of the outer surface of the faceplate is preferably 7±1%. A black or a dark colored metal oxide other than $Fe_2O_3$ may be used as a colorant. Water glass or calcium phosphate may be used as a binder when a colorant is coated on the phosphor grains. After the colorant is coated on the phosphor, the phosphor is dried or heated. The amount of the colorant is less than about 3% by weight of the phosphor grains, preferably, about 2.5% by weight for the sake of optimal brightness.

What is claimed is:

1. A monochromatic cathode ray tube for a display, wherein a phosphor screen coprising phosphor grains coated with a black pigment and for emitting monochromatic light upon irradiation with an electron beam is provided inside a faceplate comprising a single glass plate, said faceplate having a transmittance of less than 32% and a reflectance of 7±1% at an outer surface thereof.

2. A monochromatic cathode ray tube for a display according to claim 1, wherein said black pigment comprises $Fe_2O_3$.

* * * * *